(12) United States Patent
Feller

(10) Patent No.: US 6,508,134 B1
(45) Date of Patent: Jan. 21, 2003

(54) TRANSIT-TIME FLOW SENSOR-FREQUENCY MODE

(76) Inventor: Murray F. Feller, Rte. 2, Box 562A, Micanopy, FL (US) 32667

( * ) Notice: Subject to any disclaimer, the term of this patent is extended or adjusted under 35 U.S.C. 154(b) by 0 days.

(21) Appl. No.: 09/387,986

(22) Filed: Sep. 1, 1999

(51) Int. Cl.[7] ................................ G01F 1/66; G01F 1/32
(52) U.S. Cl. ................................ 73/861.27; 73/861.27; 73/861.22
(58) Field of Search .................... 73/861.22, 861.18, 73/861.25–861.29

(56) References Cited

U.S. PATENT DOCUMENTS

| | | | |
|---|---|---|---|
| 3,696,674 A | 10/1972 | Spencer | |
| 3,777,561 A | 12/1973 | Lewis | |
| 3,802,262 A | 4/1974 | Banks | |
| 3,897,684 A | 8/1975 | Dewan | |
| 3,903,741 A | 9/1975 | Greene | |
| 3,967,500 A | 7/1976 | Forster | |
| 4,195,515 A | 4/1980 | Smoll | |
| 4,346,605 A | 8/1982 | Skladzien et al. | |
| 4,409,846 A | 10/1983 | Ueno | |
| 4,825,703 A | 5/1989 | Kubota | |
| 5,691,484 A | 11/1997 | Feller | |
| 6,098,466 A * | 8/2000 | Shkarlet | 73/861.25 |
| 6,158,288 A * | 12/2000 | Smith | 73/861.25 |
| 6,178,827 B1 * | 1/2001 | Feller | 73/861.27 |

FOREIGN PATENT DOCUMENTS

| | | |
|---|---|---|
| DE | 1 231 447 | 12/1966 |
| DE | 1 648 143 | 3/1971 |
| DE | 30 00 965 A 1 | 1/1980 |
| DE | 33 29 899 A 1 | 8/1983 |
| DE | 37 00 165 A 1 | 1/1987 |
| EP | 0 069 456 A 1 | 1/1983 |
| JP | 2-280012 A | 11/1990 |

* cited by examiner

Primary Examiner—Harshad Patel
(74) Attorney, Agent, or Firm—David Kiewit

(57) ABSTRACT

A transit time ultrasonic flow sensor uses a pair of transducers that alternate between transmitting and receiving operational states, the operating frequency of a reference oscillator driving the transmitting transducer is controllably varied so as to maintain a constant phase relationship between the transmitted and received signals. A second oscillator is slaved, in frequency to the reference oscillator just before the alternation in operational states takes place and retains that frequency for most of the next operational state, and so forth. Fluid flowing along a line between the two transducers causes one of the two oscillators to swing to a higher frequency, and the other to swing low with respect to each other. A difference frequency between the two oscillators is detected and used as a basis for calculating the rate of fluid flow. In preferred versions of the invention the pair of transducers and an acoustic reflector are configured as a probe that can be inserted into the flowing fluid.

14 Claims, 3 Drawing Sheets

TRANSIT-TIME FLOW SENSOR-FREQUENCY MODE

BACKGROUND OF THE INVENTION

1. Technical Field

The present invention relates to fluid flow rate measurement devices, and more particularly to an apparatus and a method for measuring the flow rate of a fluid whereby the propagation times of ultrasonic signals transmitted through the fluid vary with the flow rate of the fluid and can be detected to determine fluid flow rate.

2. Discussion

Transient-Time ultrasonic flow sensors, also known as time-of-flight ultrasonic flow sensors, detect the propagation time difference between the upstream and downstream ultrasonic transmissions resulting from the movement of the flowing fluid and process this information to derive fluid flow rate. These sensors typically use a pair of multiplexed transducers to permit each to alternately provide both transmit and receive functions. Relatively complex multiplexing and transit-time detection electronic circuitry is necessary for achieving usable measurement precision because the change in transit-time due to the flowing fluid is typically a very small part of the total transit time. The transducers are most often mounted on the outside of the pipe which affords the convenience of avoiding penetration of the pipe. However, the uncertainty of the pipe wall uniformity and surface condition, and the variabilities of locating and attaching the transducers, often constitute unfavorable conditions which can lead to substantial measurement error. These sensors are relatively complex and expensive, and have a reputation for sometimes producing erroneous readings.

It is therefore an object of the present invention to provide improved means for processing the signals, reducing the costs and improving the reliability of transit time flow sensors.

SUMMARY OF THE INVENTION

The present invention relates to an apparatus and a method for measuring the low rate of a flowing fluid through the use of ultrasonic energy transmitted through the flowing fluid, and by monitoring the shift in frequency of transmitted and received ultrasonic signals caused by the flowing fluid. One preferred embodiment of the present invention comprises an insertion probe whereby two flow sensing ultrasonic transducers are permanently mounted on the probe which enters the pipe carrying the flowing fluid. The transducers are located one upstream and one downstream, in line with and at an angle to the flowing fluid, and are directly wetted by the fluid. The transducers are also mounted and well insulated acoustically to minimize the transfer of acoustical energy between them which has not been shifted in time by the fluid flow. A probe-mounted acoustically reflective surface is also preferably provided to enable an acoustic path between the transducers to be completed.

In a basic form of the present invention, one transducer transmits a high frequency acoustic signal which passes through the flowing fluid to the reflector and then again through the flowing fluid to the receiving transducer. The transmitted and received signals are compared in a phase detector which provides an output signal controlling the frequency of the transmitted signal to maintain a constant phase difference between the two signals, as in a phase locked loop. The change in the transit time of the acoustic signal caused by a flowing fluid causes an incremental phase shift between the transmitted and received signals which is also detected by the phase detector. The phase detector output varies the frequency of the transmitted signal which in turn varies the wavelength of the acoustic signal and therefore the acoustic phase shift between the transducers, to minimize the change in detected phase shift. That change in frequency is representative of the fluid flow rate. Since the acoustic phase shifts due to fluid flow rate are typically on the same order of magnitude as those from error sources, such as transducer, mechanical and electronic drifts, the elementary form of the present invention may likely suffer from instability and might have limited utility.

In one preferred form of the present invention the receive and transmit functions of two transducers are interchanged at a low frequency rate. The transmitted frequency from a reference oscillator is compared against the frequency of a variable frequency slave oscillator. The slave oscillator frequency is controlled to be the same as that of the reference oscillator and to retain that frequency just prior to the reversal of the transducer functions. For most of the operating period in each mode, the slave oscillator frequency is that of the reference oscillator during the prior mode of operation. A fluid flow direction which in one mode of operation causes the reference oscillator to increase in frequency, results in the slave oscillator producing, during almost all of the same period, a corresponding reduction in oscillator frequency. Both oscillators alternately swing high and low in frequency out of phase tending to cancel their error contributions. The two frequencies are combined, whereby the difference frequency is detected and provided as an output signal indicative of flow rate. A relatively low frequency oscillator is also used to occasionally reset the reference oscillator to the nominal center of its operating range to correct for transducer mechanical or electronic related drifts over a period of time.

At zero fluid flow rate, the reference and slave oscillator frequencies are equal and the output frequency is therefore automatically zero. When fluid flow occurs, a continuous output frequency signal is produced representative of the flow rate. Since the output frequency range can easily be several kilohertz or even tens of kilohertz, a very wide dynamic range of operation is inherent with this electronic processing means. Furthermore, as phase detection is used in a feedback system over a narrow range, its error contribution to the fluid flow rate measurement error is small compared to that of a phase detector used to detect the full range of time difference between the transmitted and received signals. Such processing means are therefore applicable to a wide range of transit-time ultrasonic flow sensors and, in particular, to insertion probe and 2-measurement axis sensor configurations.

BRIEF DESCRIPTION OF THE DRAWINGS

The various advantages of the present invention will become apparent to one skilled in the art by reading the following specification and subjoined claims and by referencing the following drawings in which:

FIG. 1A illustrates a simplified end cross-sectional view of the sensor of FIG. 1;

DETAILED DESCRIPTION OF THE PREFERRED EMBODIMENTS

Figure 1:
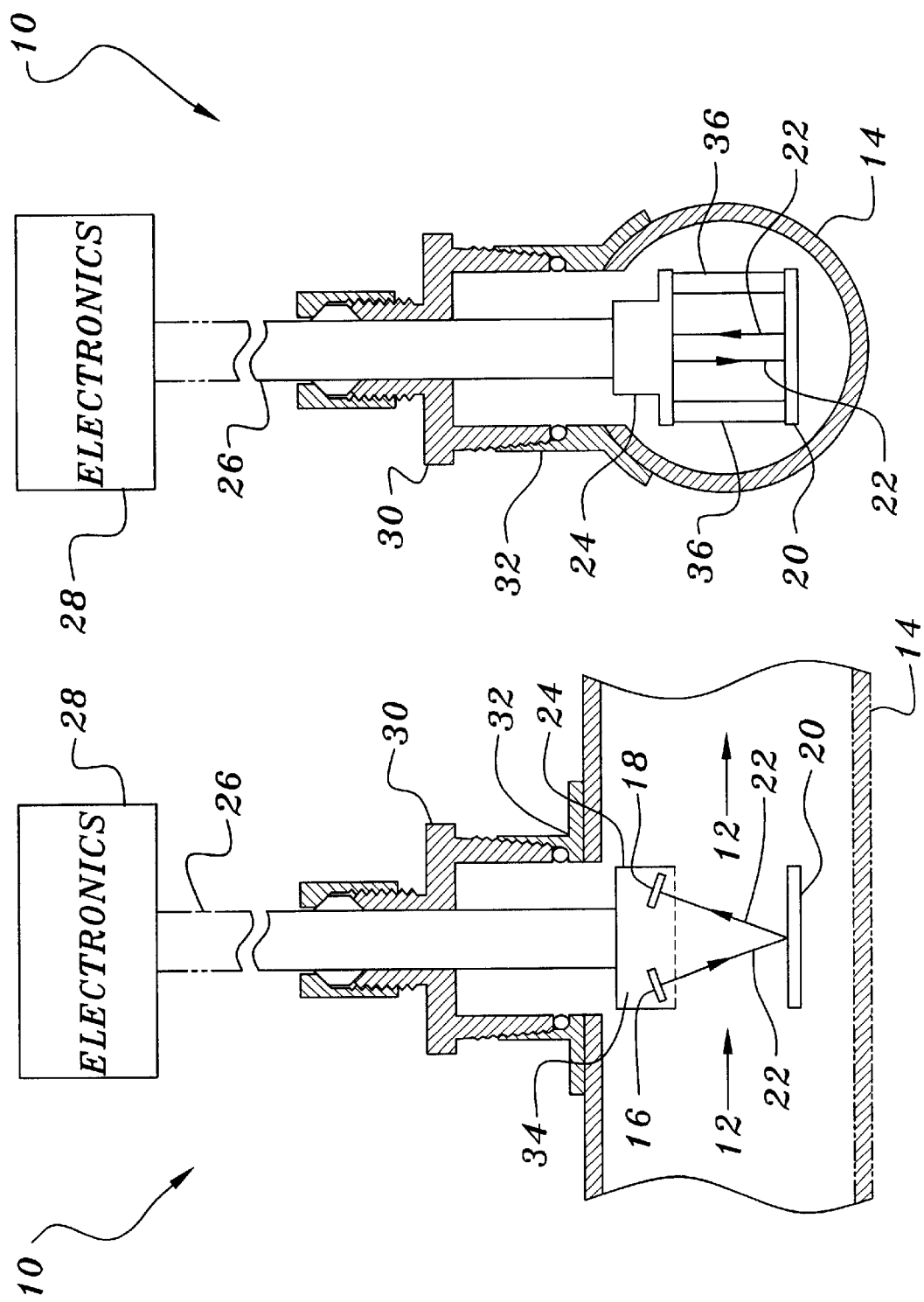
FIG. 1 illustrates a simplified cross-sectional view of a preferred embodiment of the transit time ultrasonic flow sensor of the present invention.

Referring to FIG. 1 and FIG. 1A, a flow sensor 10 in accordance with a preferred embodiment of the present invention is shown. Fluid flow represented by arrow 12 enters pipe 14 and passes between a pair of piezoelectric transducers 16 and 18, and a reflector 20. Transducers 16 and 18 are each located and surrounded by an acoustic absorbing material 34 for example, cork, to minimize the transfer of acoustic energy between them within a housing 24, and to maximize the transfer of acoustic energy beamed along the signal path lines 22. This enables the transmitted and received signals to be well isolated from each other so that they may be phase compared. The housing 24 is used for mounting the transducers 16 and 18, and joins with stem 26 upon which is mounted an electronics enclosure 28. The reflector is supported by posts 36 (FIG. 1a). A stem 26 coupled to housing 24 extends through a hot tap fitting 30 to a pipe mounted fitting 32.

Transducers 16 and 18 are angled so that acoustic energy which is not reflected between them is propagated away from sensor 10 and does not interfere with its operation. Since transducers 16 and 18 are not acoustically connected to the pipe 14, the pipe is no longer a medium for conveying acoustic signals between them. Operation is very clean and there is little signal interaction between the transducers.

In prior art devices, the transmitted signal usually consists of a few high magnitude carrier cycles followed by a relatively long period of inactivity both prior to and after the acoustic signal reaches the receiving transducer. A narrow reception window of time is opened for the receiving transducer to be active to minimize the effects of interfering signals from direct conduction, reflection and reverberation of acoustic energy. With the present invention, it is permissible to continue transmitting with the transmitting transducer while the receiving transducer is transmitting and phase comparison is taking place, since the interfering signals are of relatively low magnitude with respect to the desired signal. Alternatively, the reference and slave oscillators may continue to operate continuously while the transducers are switched to actively transmit or receive only during short periods of time so that the desired acoustic energy which is travelling along the path between the transducers, while also passing through the fluid, is detected. This enables flow sensing operation to proceed under less than ideal conditions, for example, when the transducers are mounted on the outside surface of a metal tube carrying a flowing fluid. This also helps to significantly reduce the power consumption of the transducers.

Figure 2:
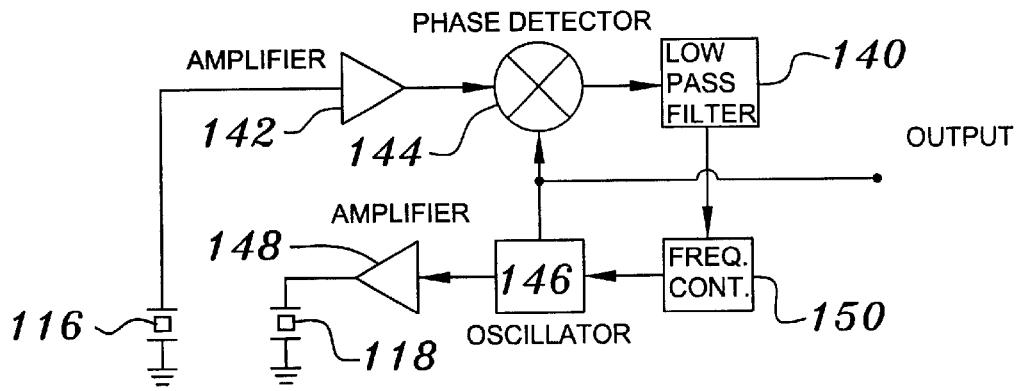
FIG. 2 illustrates a block diagram indicating the major functional blocks of electronic circuitry in accordance with an embodiment of the invention.

FIG. 2 illustrates a block diagram of a representative electronic circuit for the present invention. An oscillator 146 generates a carrier signal, typically several megahertz, which is amplified by amplifier 148, and which powers transmitting transducer 118 corresponding to transducer 18 in FIG. 1. This signal is converted into a representative acoustic energy signal which is received by transducer 116, corresponding to transducer 16 in FIG. 1. The corresponding signal produced by transducer 116 enters amplifier 142 for amplification, and then phase detector 144. The signal from oscillator 146 also enters phase detector 144. The output from phase detector 144 is a DC level signal corresponding to the phase relationship between its two input signals. This signal is filtered in low pass filter 140 to remove the carrier frequencies prior to entering frequency controller 150. Frequency controller 150 varies the frequency of oscillator 146 that provides the output signal. The DC level signal produced by the phase detector 144 ultimately shifts the frequency of oscillator 146 in the direction necessary to maintain the phase relationship of its two input signals constant, as in a typical phase locked loop.

When fluid flow is present, as represented by flow arrow 12 in FIG. 1, the acoustic transit time between transducers 118 and 116 varies in proportion to the velocity contribution of the fluid flow. The incremental change in the transit time, which is converted by the components of FIG. 2 to an incremental frequency change of oscillator 146, is representative of the fluid flow rate. That incremental frequency change may be extracted and referenced to zero hertz, for example, by combining the oscillator 146 output with that of another signal source having a stable frequency equal to that of oscillator 146 when the fluid is stationary. The difference frequency between the two signal sources may then be detected. The difference frequency will vary between zero, corresponding to zero fluid flow rate, and some finite frequency corresponding to the fluid flow rate.

The utility of the embodiment represented by FIG. 1 is quite limited because the incremental phase shift, usually represented by the fluid flow 12, is very small and generally on the same order as the phase shift drifts and uncertainties exhibited by the associated transducers, mechanical structure and electronics. These problems are substantially reduced by using electronic circuitry in accordance with the circuit of FIG. 3, whereby the FIG. 3 blocks having functions similar as those in FIG. 2 have reference numerals increased by 100.

Figure 3:
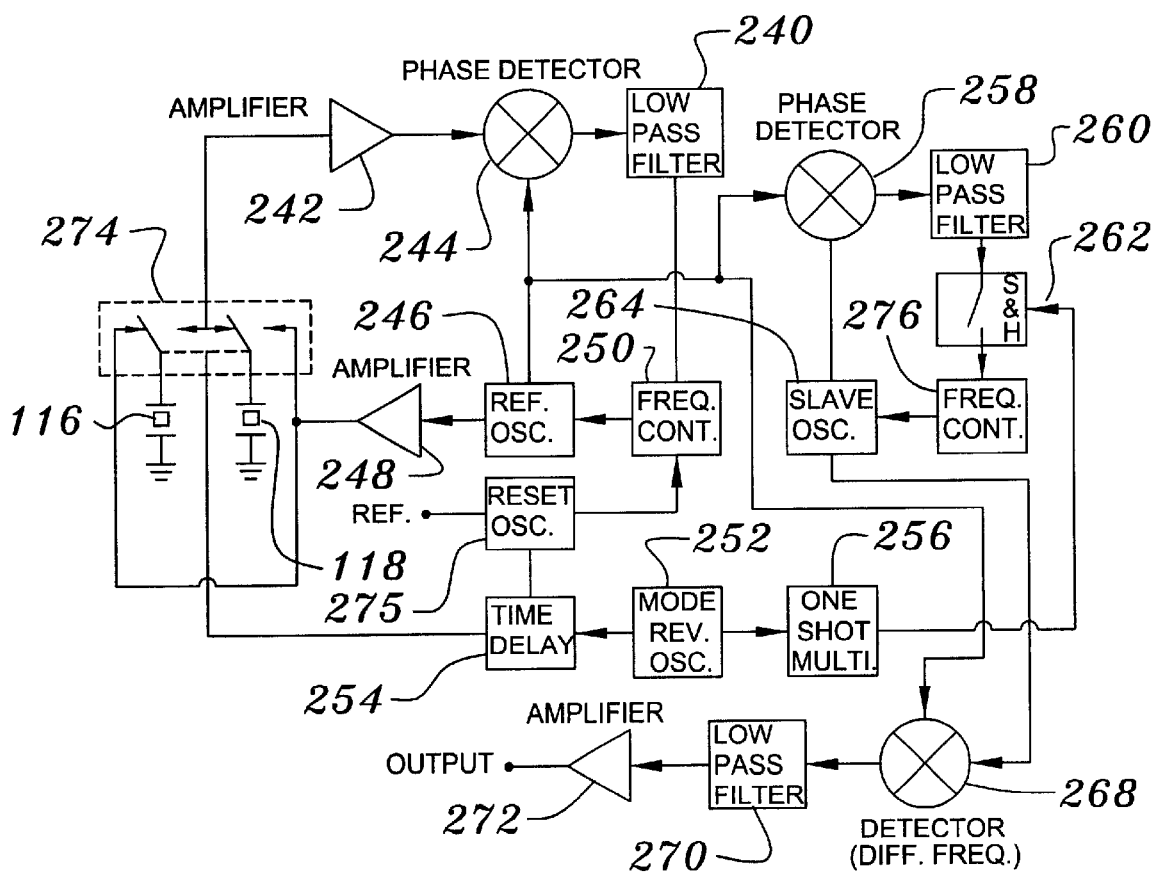
FIG. 3 illustrates a block diagram indicating the functional blocks of electronic circuitry in accordance with a preferred embodiment of the invention.

FIG. 3 illustrates the block diagram of a preferred embodiment of an electronic circuit of the present invention. Reference oscillator 246 generates a carrier signal, typically several megahertz, which is amplified by amplifier 248 and powers transmitting transducer 216 corresponding to transducer 16 in FIG. 1. This signal is converted to representative acoustic energy which is received by transducer 218, which corresponds to transducer 18 in FIG. 1. The corresponding signal produced by transducer 218 enters amplifier 242 for amplification and then phase detector 244. The signal from reference oscillator 246 also enters phase detector 244. The output from phase detector 244 is a DC level signal corresponding to the phase relationship between its two input signals. This signal is filtered in low pass filter 240 to remove the carrier frequencies prior to entering frequency controller 250. Frequency controller 250 varies the frequency of reference oscillator 246. The DC level signal produced by the phase detector 244 ultimately shifts the frequency of reference oscillator 246 in the direction needed to maintain the phase relationship of its two input signals constant, as in a typical phase locked loop.

Mode reversal oscillator 252 provides a low frequency, typically a 10 to 100 hertz square wave signal, which is delayed a small amount by time delay 254 to change the state of relay 274 so that transducers 216 and 218 are alternately switched between transmitting and receiving functions. The mode reversal oscillator 252 signal also triggers a one-shot multivibrator 256 to produce a short duration pulse from each transition of the square wave from mode reversal oscillator 252. These pulses enable the sample and hold circuit 262 to thereby detect and retain the DC level at the output of low pass filter 260 that was produced at phase detector 258 from the phase detection of the signals from oscillators 246 and 264 just before relay 274 changes state. That DC level signal is used by frequency control 276 to control the frequency of slave oscillator 264 so that during the period of the pulses provided by the one-shot multivibrator 256, the slave oscillator 264 frequency is controlled as in the manner of a typical phase locked loop to produce a frequency exactly the same as that of reference oscillator 246. During the interval between the pulses, the slave oscillator 264 frequency is maintained at its most recent setting as determined by the DC level signal established by the sample and hold circuit 262.

Signals from oscillators 246 and 264 enter detector 268 which detects their sum to provide a signal with a difference frequency representative of fluid flow rate. Low pass filter 270 removes carrier signal components while amplifier 272 provides the magnitude of the output signal as desired.

Reset oscillator 252 produces pulses typically at a very low frequency rate such as once every few seconds, which are synchronized to be coincident with the leading edge of the output from time delay 254. These pulses enable a switch to momentarily connect a reference voltage to the frequency controller 250 so that reference oscillator 246 is momentarily forced to change its frequency to the nominal center of its operating range. Once phase locked near its nominal center, it will tend to remain in that general location. In this way drifts from any source, or operating or startup transients which may have caused a phase lock to occur at some frequency considerably away from the center of the operating range, are either corrected within a short time or prevented from occurring.

Transducer 216 transmits continuously for a half cycle as determined by oscillator 275 while transducer 218 receives during the same period. For the next half cycle the transducers reverse functions and so forth. In each mode, the flowing fluid causes a shift in the transit-time, essentially a phase shift in the frequency of the transmitted acoustic energy reaching the receiving transducer. The electronic processing means detects the acoustic phase shift for each mode of operation due to the flowing fluid and changes the frequency of the transmitted acoustic energy to minimize that change in phase shift.

The electronic processing means uses a variable frequency reference oscillator 246 which determines the transmitted frequency. The received signal is compared in phase detector 244 with that of the transmitted frequency whereby its detected output is fed back to the reference oscillator 246 to shift its frequency so as to minimize any phase change, as in a phase locked loop. This action results in the reference oscillator 246 frequency changing in response to flow rate changes. In one mode of operation the reference oscillator 246 frequency will be reduced by the action of the flowing fluid while in the other mode of operation, when the transducers 218 and 218 have changed functions, the frequency will be increased. By incorporating a detector to determine whether the reference oscillator frequency is higher or lower than the slave oscillator 264 when referenced to the mode reversal oscillator, flow direction may be determined. The electronic processing means if therefore capable of being broadly applied for ultrasonic flow detection, including the detection of Karman vortex induced flows.

The reference oscillator 246 frequency is compared against the frequency of a variable frequency slave oscillator 264, whereby the slave oscillator 264 frequency is forced to be the same as that of the reference oscillator 246 and to retain that frequency just prior to the mode change which reverses the transducer functions. For most of the operating period in each mode, the slave oscillator 264 frequency is that of the reference oscillator 246 at the end of the prior mode of operation because of the time delay introduced by time delay 254. A flow direction which in one mode of operation causes the reference oscillator 246 to increase in frequency results in the slave oscillator 264 producing, during that same period, a corresponding reduction in oscillator frequency. Both oscillators alternately swing high and low in frequency out of phase so as to maintain their difference frequency constant. The two oscillator signals are combined in detector 268 whereby their difference frequency is detected, low pass filtered in filter 270 and amplified in amplifier 272 to provide a continuous output signal with a frequency representative of fluid flow rate.

Figure 4:
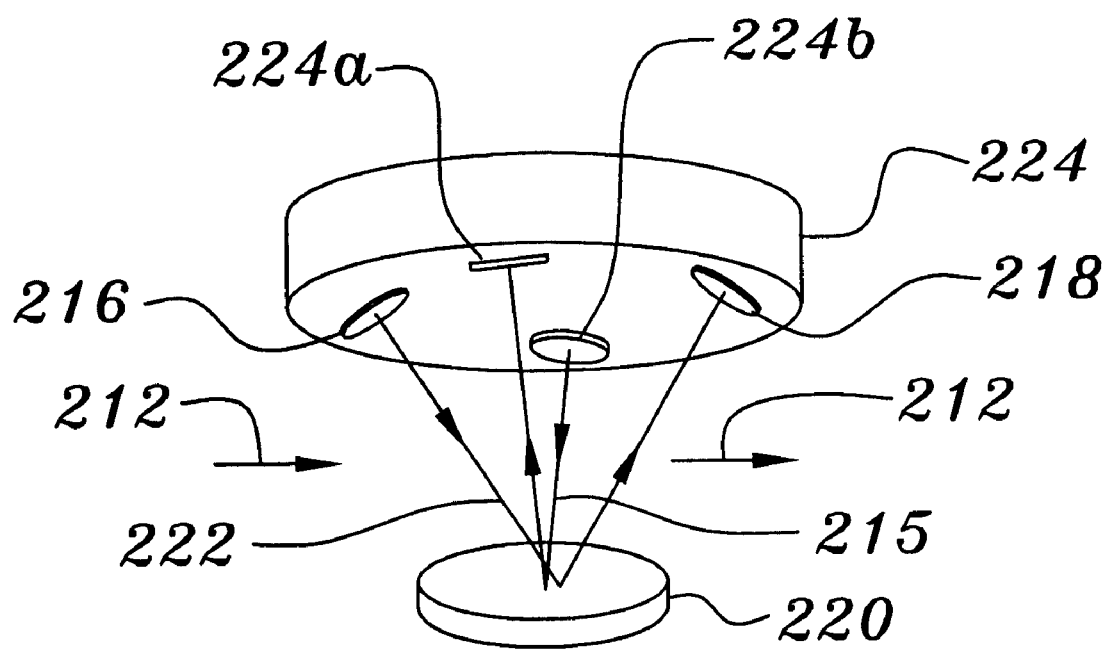
FIG. 4 illustrates an arrangement of two pairs of transducer elements in accordance with an alternative preferred embodiment of the invention.

The flow sensor configuration of probe 10 is also suitable for use in open channels and in large bodies of water, for example, as it provides for the complete acoustic reflective path within itself. Furthermore, a second set of transducers located in an enlarged form of housing 24, and mounted orthogonally to transducers 16 and 18, which similarly beam to and receive from reflector 20, will provide a measurement of flow rate in a direction orthogonal to the first set whereby their rate and directional components enable a resultant flow rate and angle to be determined by electronic computation. Such a transducer arrangement is illustrated in FIG. 4 whereby transducers 216 and 218, corresponding to transducers 16 and 18 of probe 10, establish an acoustic energy beam line 222. The beam line 222 is reflected by reflector 220 to sense the component of the fluid flow which moves horizontally across the page, in the direction of arrow 212. Transducers 224a and 224b, mounted in the same housing 224, also establish an acoustic energy beam, represented by lines 225, to sense the component of fluid flow moving orthogonally to energy beam 222. It is possible for both sets of transducers 216, 218 and 224a, 224b to operate at the same time when the acoustic beam angles are narrow. Should excessive interaction occur, however, the sets of transducers can operate sequentially or even at different frequencies. Each set of transducers 216 and 218, and 224a and 224b is supported by its own electronics as in the FIG. 2 example or, alternatively, they may be multiplexed to share the same electronics.

When used in flow environments which encourage the accumulation of surface coatings, debris or biogrowths, electrolytic means may be used to clean the acoustically active surfaces. This would consist in a sea water environment, for example, of a positive potential being applied to the flow sensing or nearby surfaces which had been platinum plated so as to cause a corresponding electric current to flow through the water and generate chlorine gas at those active surfaces. Nearby insulated electrodes or conductive surfaces with a corresponding negative potential complete the current path. Low currents of several milliamperes and less have been found effective in maintaining the surfaces of a small flow sensor of a few square inches in surface area clean in such environments.

Those skilled in the art can now appreciate from the foregoing description that the broad teachings of the present invention can be implemented in a variety of forms applicable to transit-time ultrasonic flow sensors. Therefore, while this invention has been described in connection with particular examples thereof, the true scope of the invention should not be so limited since other modifications will become apparent to the skilled practitioner upon a study of the drawings, specifications and claims.

What is claimed is:

1. A transit time flow sensor for measuring a propagation time difference between upstream and downstream acoustic transmissions in a fluid and for determining a flow rate of the fluid therefrom, the sensor comprising,
   a transmitting transducer adapted to transmit, when wetted by the fluid, at least a component of acoustic energy along an axis parallel to a direction of fluid flow;
   a receiving transducer adapted, when wetted by the fluid, to receive said component of acoustic energy;
   a system responsive to a change in time between the transmitted and the received components of acoustic energy, the system adapted to adjust a frequency of the transmitted component of acoustic energy so as to maintain a constant phase relationship between said transmitted and said received components of acoustic energy and for extrapolating therefrom a frequency representative of said flow rate of said fluid.

2. The transit time flow sensor of claim 1, wherein said transmitting transducer and said receiving transducer are adapted to alternate the functions of transmitting and receiving so that a frequency difference between said transmitted and received components of acoustic energy during said alternated functions is representative of said fluid flow rate.

3. The transit time flow sensor of claim 2, further comprising;
   a reference oscillator adapted to provide a reference frequency at which the transmitting transducer transmits said component of acoustic energy; and
   a slave oscillator adapted to provide the reference frequency prior to an alternation of the transmitting and receiving functions;
   wherein the system is adapted to combine the frequencies from the reference oscillator and from the slave oscillator to produce the frequency difference representative of fluid flow rate.

4. The transit time flow sensor of claim 3, wherein:
   said transmitting transducer is adapted to transmit the component of acoustic energy for a short time period during each said alternation of said transmitting and receiving functions;
   said receiving transducer is adapted to receive said component of acoustic energy for each alternation of said transmitting and receiving functions only during a time interval when said component of acoustic energy travels a path between said transmitting transducer and said receiving transducer while passing trough said fluid.

5. The transmit time sensor of claim 1, further comprising:
   a reflector adapted to convey said component of acoustic energy between said transmitting transducer and said receiving transducer when the reflector is wetted by the fluid.

6. The transit time sensor of claim 5, further comprising a second transmitting transducer and a second receiving transducer which are mounted orthogonally to said transmitting transducer and said receding transducer and which use said reflector to complete a second acoustic path between them, and wherein the system is further adapted to extrapolate, from a second change in time between components of acoustic energy transmitted between said second transmitting and said second receiving transducers, a rate at which the fluid is flowing along the direction of die second acoustic path.

7. The transit time flow sensor device of claim 1, further comprising means by which an electric current is caused to flow through said fluid to cause electrolytic action at least one wetted surface of the sensor.

8. A method of measuring a flow rate of a flowing fluid, the method comprising the steps of:
   transmitting from a transmitting transducer wetted by the fluid, at least a component of acoustic energy directed along an axis parallel to a direction of flow of said flowing fluid;
   receiving, by means of a receiving transducer wetted by the fluid, the component of acoustic energy;
   using a system responsive to a change in time between said transmitted and said received components of acoustic energy to adjust a frequency of said transmitted component of acoustic energy so as to maintain a constant phase relationship between said transmitted component of acoustic energy and said received component of acoustic energy for extrapolating therefrom a frequency representative of said flow rate of said flowing fluid.

9. The method of claim 8, whereby said transmitting and said receiving transducers alternate their functions of transmitting and receiving so that a frequency difference between said transmitted and received components of acoustic energy during said alternation of functions is representative of said fluid flow rate.

10. The method of claim 9, wherein:
    a reference oscillator provides a reference frequency signal to the transmitting transducer and the transmitting transducer transmits said component of acoustic energy at the reference frequency;

a slave oscillator provides the same reference frequency at a time prior to the alteration of functions of said transmitting and said receiving transducers; and wherein frequencies from the reference oscillator and from the slave oscillator are combined and are detected to produce the frequency difference representative of said fluid flow rate.

11. The method of claim 10, wherein the reference frequency of the reference oscillator is periodically centered within an operating range.

12. A transit time flow sensor for measuring a propagation time difference between upstream and downstream acoustic transmissions in a fluid and for determining a flow rate of a flowing fluid therefrom, the flow sensor comprising:

a transmitting transducer for continuously transmitting, when wetted by the fluid, at least a component of acoustic energy along an axis parallel to a direction of flow of said flowing fluid;

a receiving transducer for continuously receiving, when wetted by the fluid, said component of acoustic energy; and a system responsive to the propagation time difference, the system adapted to adjust a frequency of said transmitted component of acoustic energy to maintain a constant phase relationship between said transmitted component of acoustic energy and said received component of acoustic energy for extrapolating therefrom a frequency representative of said flow rate of said flowing fluid.

13. The transit time flow sensor of claim 12, wherein said transmitting transducer and said receiving transducer are adapted to alternate the functions of transmitting and receiving so that a frequency difference between said alternated functions is representative of said fluid flow rate.

14. The transmit time flow sensor of claim 13, wherein:

a reference oscillator is adapted to provide a reference frequency at which the transmitting transducer transmits said component of acoustic energy;

a slave oscillator is adapted to provide the reference frequency prior to the alternation of said transmitting and said receiving functions; and signals from said reference oscillator and said slave oscillator are combined and are detected to produce a difference frequency which is representative of fluid flow rate.

* * * * *